Patented May 12, 1931

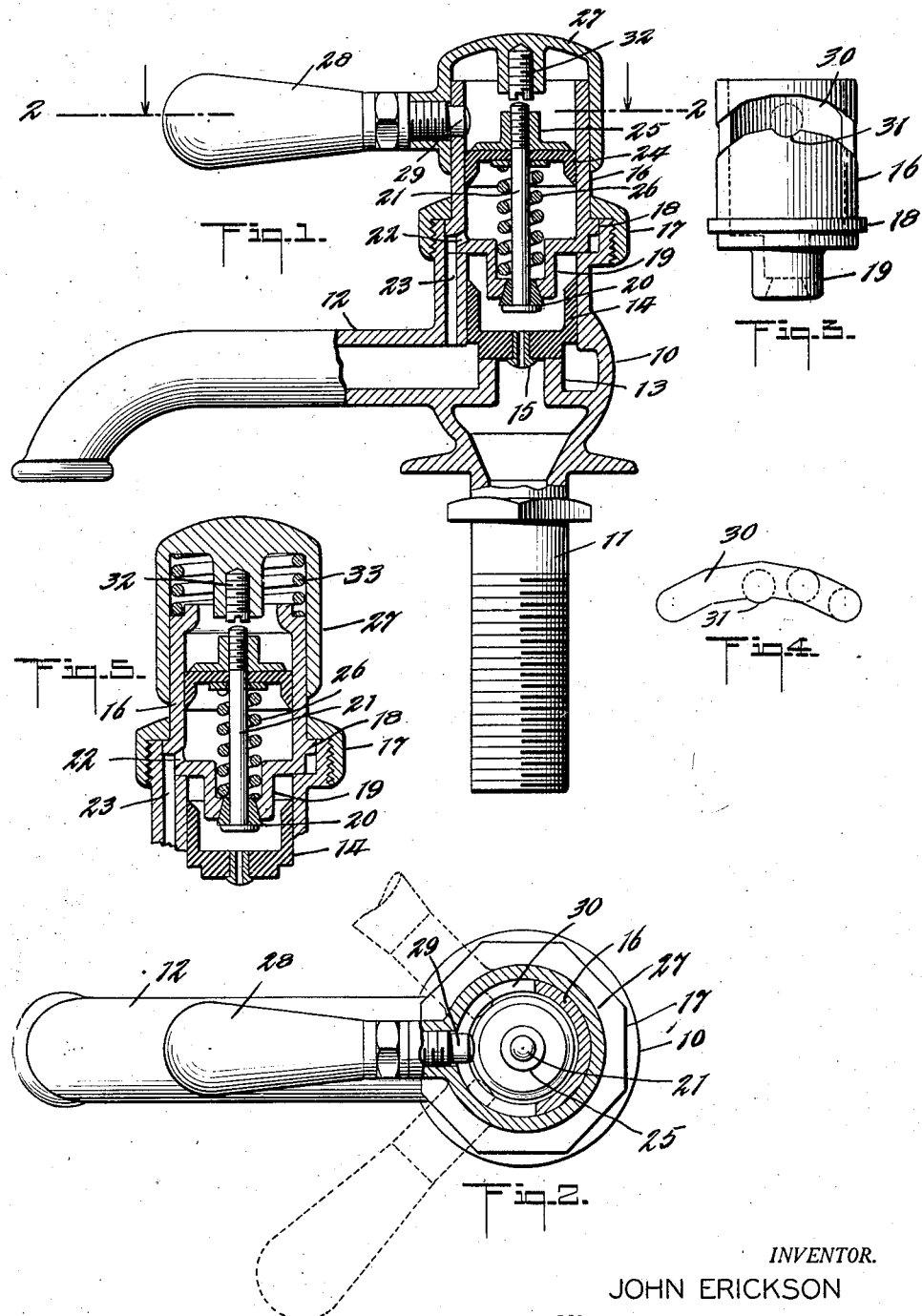

1,804,865

UNITED STATES PATENT OFFICE

JOHN ERICKSON, OF TROY, NEW YORK, ASSIGNOR OF FIFTY-ONE ONE-HUNDREDTHS TO SWEET & DOYLE FOUNDRY & MACHINE CO., OF TROY, NEW YORK, A CORPORATION OF NEW YORK

HYDRAULIC FAUCET

Application filed July 10, 1926. Serial No. 121,519.

The present invention relates to improvements in faucets, for permitting and controlling the flow of liquids from pipes.

Among the principal objects which the invention has in view are: To provide a faucet in which the operating parts are exempt from deterioration due to the effects of the liquid; to provide means for accurately obtaining any desired flow; to provide a faucet which, when shut off, instantly checks all flow; and chiefly to provide improvement in faucets with a view to simplifying and cheapening the construction and rendering the same more effective in operation.

With the above and further objects in view, the invention also consists in the arrangement of parts and details of construction more particularly pointed out in the following description of the accompanying drawings forming a part of this specification and wherein Figure 1 is an elevational view partly in section of the improved faucet;

Figure 2 is a plan view partly in section, the section being taken thru the plane indicated by the line 2—2 of Figure 1;

Figure 3 is a view of a detail of the faucet the detail being shown in elevation and isolated;

Figure 4 shows the layout of the cam slot employed; and

Figure 5 is an elevational sectional view of a modified form of the invention.

Referring now to the drawings in which similar numerals denote similar elements throughout the several views, the improved faucet comprises a metal casting 10 having the customary inlet 11 and outlet or spout 12 for the liquid. The body of the casting is provided with an inwardly projecting flange 13 integrally formed with the casting, and which serves as a seat for the plunger 14. The plunger may be composed of any suitable flexible material so that when on its seat it acts as an effectual seal to check the flow of the liquid. A small metallic rivet 15 extends thru the plunger and has a central aperture or port allowing the passage of a fine stream of liquid.

An element 16 somewhat similar to a bushing shown isolated in Figure 3 closes the top of the casting. A lock nut 17 threaded on the top of the casting bears against a ridge 18 extending around the periphery of the bushing and clamps the bushing securely in place. The bushing has a reduced part 19 projecting within the casting, the bottom of the projecting part being provided with a conically shaped hole into which seats a plug 20 of flexible material. This plug acts as a valve to admit or cut off the flow of liquid into the bushing. Secured to the plug is a valve stem 21 which serves to actuate the plug. A channel for establishing communication between the interior of the bushing and the spout is formed by means of an orifice 22 thru the side of the bushing and another orifice 23 coinciding therewith and extending thru the casting.

A cup washer 24 is attached to the valve stem near its top as by a nut 25. The cup washer is composed of a soft flexible material such as rubber and serves both as a guide for the valve stem and as a packing for the chamber formed by the bushing. A coil spring 26 encircles the valve stem and bears at one end against the cup washer and at the other end against the bottom of the bushing, and serves to maintain the plug 20 on its seat.

A cap 27 covers the top of the bushing and is adapted for rotation thereon. The cap has a handle 28 readily attached thereto which handle has a stud 29 projecting into a cam slot 30 formed in the side of the bushing. The layout of the cam slot is shown in Figure 4 and as there shown it is provided with a lower centrally cut away portion 31, the purpose of which will become apparent as the description proceeds. A set screw 32 is threadedly attached to the interior of the cap, vertically above the top of the valve stem 21. The set screw may be adjusted to vary the characteristics of the flow of liquid and to compensate for any wear that may occur.

The closed position of the faucet is shown in the drawings and in this position there is no liquid flowing out of the spout. Due to the aperture in the rivet 15, the chamber above the plunger 14 is filled with liquid and the pressure within this chamber is the same as that of the pressure in the pipe. The force tending to maintain the plunger on its seat, therefore, is proportionate to the difference between the upper area of the plunger and the lower area exposed to the pressure of the liquid from the pipe and is in fact equal to the product of this difference by the pressure within the pipe. Inasmuch as the difference in area is constant, there will always be a force tending to maintain the plunger on its seat when the faucet is closed and as long as the plug 20 cuts off communication into the interior of the bushing although the force may vary because of variations of the pressure within the pipe.

In order to obtain a flow of liquid, the handle 28 is turned in either direction. The action of the stud 29, associated with the handle in the cam slot 30 of the bushing, causes the cap 27 to be lowered and the set screw 32 comes in contact with the top of the valve stem and lowers this valve stem against the action of the spring 26, thus lifting the plug 20 off its seat. The liquid above the plunger 14 now passes into the interior of the bushing and out thru the orifices 22 and 23 into the spout. The pressure above the plunger is thus released and therefore the pressure below the plunger lifts the plunger off its seat and allows the liquid to flow directly into the spout beneath the plunger.

While the plunger is off its seat and the liquid is flowing beneath it into the spout, a very fine stream is continually passing thru the aperture in the plunger and out thru the orifices 22 and 23, where it mixes with the rest of the flow. When, however, the handle is turned back to close the faucet, the cap and its associated set screw are elevated, the spring 26 aided by the pressure of the liquid forces the valve stem upward so that the plug 20 cuts off communication with the interior of the bushing and the small stream is checked. A pressure is rapidly built up above the plunger and it is therefore forced down on its seat and all flow ceases. The above actions take place almost simultaneously so that there is very little interval of time elapsing between the turning of the handle back to its closed position and the complete checking of the flow.

A perfect control of the flow can be obtained at all times by adjusting the position of the handle. The cam slot extends about half way around the circumference of the bushing and a maximum flow is obtained when the handle is turned about a quarter of a turn in either direction, at which points the valve stem is lowered to its greatest extent and the pressure above the plunger is therefore least. Intermediate positions of the handle will cause the pressure above the plunger to have different values because of variations in the resistance to the flow of liquid from above the plunger into the spout and, therefore, the plunger will assume various positions corresponding to the positions of the handle. Any flow may therefore be obtained by changing the position of the handle and it may be varied from a very fine trickle to a maximum.

When the handle 28 is at its closed position, a full flow of liquid may be obtained merely by pressing down on the cap 27. The cut away portion 31 in the cam slot 30 permits the cap to be thus lowered. A full flow can therefore be obtained without having recourse to the handle. Moreover, the handle may be left off entirely and the faucet becomes a self closing bibb, as is shown in Figure 5. A spring 33 may be employed in connection with this modification to augment the speed with which the cap is lifted when released and the faucet closed. When the faucet is thus used solely as a self closing bibb, the necessity for a cam slot no longer exists.

The simplicity and cheapness of the above described construction and the fewness of the number of parts compares favorably with the ordinary faucet. The valve parts exposed directly to the action of the liquid, that is the plunger 14 and the plug 20, have reciprocating motion only and as a consequence are exempt from the usual causes of wear found in the ordinary faucets. The above construction is further characterized in the accuracy with which the flow may be governed, in the rapidity with which the flow may be caused to cease and in the elimination, or at least substantial reduction of the objectional effects due to the so called "water hammer" following the checking of the flow.

It will be apparent that variations and alterations may be made in the specific structure described without departing from the spirit of the invention and I desire, therefore, to be limited only by the state of the prior art and the scope of the appended claims.

What I claim is:—

1. In a device of the class described, a body portion having an inlet and an outlet for a fluid, a plunger adapted to cover said inlet and having an aperture for the passage of fluid, means forming a closed chamber above the plunger wherein the fluid passing through the aperture is confined, a valve for controlling the flow of fluid from the closed chamber to the outlet, and means for operating said valve, said operating means including a cap having a stud projecting therefrom disposed in a cam slot, which slot has a portion cut away to allow movement of said cap in the direction of the valve.

2. In a device of the class described, a body portion having an inlet and an outlet for a fluid, a plunger adapted to cover said inlet and having an aperture for the passage of fluid, a hollow member disposed in the body portion above the plunger, a valve for controlling the flow of fluid from above the plunger into said hollow member, operating means for the valve including a cap disposed over the hollow member, a handle secured to the cap and a stud associated with the cap and handle and disposed in a cam slot formed in the hollow member, and means for conveying fluid from within the hollow member to the outlet.

3. In a device of the class described, a body portion having an inlet and an outlet for a fluid, a hollow member disposed above the body portion, a valve for controlling the flow of fluid from the body portion into the hollow member, operating means for the valve including a cap disposed over the hollow member, and a stud associated with the cap and disposed in a cam slot formed in the hollow member, said cam slot extending circumferentially around a portion of the hollow member and gradually changing in elevation from a maximum height to a minimum height, and means for conveying fluid from within the hollow member to the outlet.

4. A device according to claim 3, in which the cam slot is cut away vertically at its position of maximum elevation, said cutaway portion permitting vertical movement of the stud therein.

In testimony whereof, I have signed my name to this specification this 2nd day of July, 1926.

JOHN ERICKSON.